United States Patent [19]

Sugisaki

[11] Patent Number: 5,206,798
[45] Date of Patent: Apr. 27, 1993

[54] CHIP-TYPE SOLID ELECTROLYTIC CAPACITOR WITH A FUSE

[75] Inventor: Yukio Sugisaki, Tokyo, Japan
[73] Assignee: NEC Corporation, Tokyo, Japan
[21] Appl. No.: 899,849
[22] Filed: Jun. 17, 1992
[30] Foreign Application Priority Data
 Jun. 19, 1991 [JP] Japan .................................. 3-146402
[51] Int. Cl.⁵ .............................................. H01G 9/06
[52] U.S. Cl. ................................................... 361/534
[58] Field of Search .......................... 361/534; 357/51; 29/25.03

[56] References Cited
U.S. PATENT DOCUMENTS
4,169,271 9/1979 Saitoh ..................................... 357/51
4,763,228 8/1988 Su ......................................... 361/534
4,989,119 1/1991 Govvernelle ........................ 361/534

Primary Examiner—Donald A. Griffin
Attorney, Agent, or Firm—Sughrue, Mion, Zinn Macpeak & Seas

[57] ABSTRACT

In a chip-type solid electrolytic capacitor with a fuse, a cathode terminal has an inside connecting portion, an outside lead portion, and a fuse for bridging between the inside connecting portion and the outside lead portion. Predetermined portions including the fuse are protectively insulated by protective resin which is provided with a projecting portion. Part of the protective resin is exposed from a molding resin. The cathode terminal arranged as described above is preliminarily formed as an integral article. In the assembling process, a cathode layer of a capacitor element and the inside connecting portion are assembled together so as to be adhered and conducted to each other.

3 Claims, 2 Drawing Sheets

CHIP-TYPE SOLID ELECTROLYTIC CAPACITOR WITH A FUSE

BACKGROUND OF THE INVENTION

1. Field of the Invention

The present invention relates to a chip-type solid electrolytic capacitor with a fuse and, more particularly, to a structure of a cathode terminal section with a fuse.

2. Description of the Related Art

Generally, a solid electrolytic capacitor is used in various electronic circuits, and is advantageous in that its failure rate is low. Once failure occurs, however, there will be many cases where short-circuiting occurs. When large short-circuiting current flows in such a case, a capacitor element may be heated up to be burnt out.

In order to prevent the capacitor element from being burnt out, which occurs with failure due to the excessive short-circuiting current, and in order to protect peripheral circuit elements, it is necessary to open the capacitor element in case of such short-circuiting.

For this purpose, conventionally, a solid electrolytic capacitor of the type in which a fuse is built in has generally been used. This solid electrolytic capacitor will hereinafter be referred to as "a solid electrolytic capacitor with a fuse".

FIGS. 4(a) and 4(b) are a perspective view and a cross-sectional view, respectively, showing the constitution of a conventional solid electrolytic capacitor with a fuse. In the solid electrolytic capacitor with a fuse, a capacitor element 1 is composed of an anode lead 2 and a cathode layer 3. An anode terminal 4 is connected to the anode lead 2. Further, the cathode layer 3 and a cathode terminal 5 are adhered to each other by an insulating adhesive 6. A fuse 7 is connected to the cathode layer 3 and the cathode terminal 5 by solder 8 so that the cathode layer 3 and the cathode terminal 5 are bridged to each other. Furthermore, the fuse 7 is covered with an elastic resin 9, and all of the elements referred to the above are armored by a molding resin 10.

The conventional chip-type solid electrolytic capacitor with a fuse, as described above, is of the constitution in which the cathode layer and the cathode terminal are electrically connected to each other by the fuse. With this arrangement, therefore, the conventional solid electrolytic capacitor with a fuse has the following disadvantages:

(1) The fuse and the capacitor element are directly connected to each other. Accordingly, when overcurrent flows to heat up the fuse disadvantageously, the heat indirectly melts the solder on the cathode layer so that the solder is thermally expanded to destroy the molding resin.

(2) The insulating adhesive is used for providing insulation between the cathode layer and the cathode terminal of the capacitor element. When the fuse is connected during the manufacturing process, however, the cathode layer and the cathode terminal may be in danger of short-circuiting to each other during a step in which the adhesive hardens. Accordingly, it is required that at least one of the cathode layer and the cathode terminal be preliminarily insulated.

(3) The capacitor element and the cathode terminal are apt to be exposed outside the molding resin, depending upon the connection between the anode lead and the anode terminal and the connection of the fuse. In addition, since the capacitor element per se is not necessarily constant in dimension and configuration due to the capacity and withstanding voltage, a position where the fuse and the cathode layer are connected to each other by soldering is therefore not constant, thus making it difficult to automatically solder the fuse.

As described above, in the conventional chip-type solid electrolytic capacitor with a fuse, the manufacturing step, particularly, the fuse connecting step will be troublesome and cumbersome. Thus, it is difficult to improve the reliability of the fuse to reduce the cost.

SUMMARY OF THE INVENTION

It is a first object of the invention to provide a chip-type solid electrolytic capacitor with a fuse, in which, even if the capacitor is short-circuited, destruction of the molding resin and accidental burnout of the capacitor per se are unlikely to occur so that safety of a circuit can be improved as a whole.

It is a second object of the invention to provide a chip-type solid electrolytic capacitor with a fuse, in which connecting length of the fuse can be made constant to automate and simplify the connecting step and reliable fuse connection can be obtained.

It is a third object of the invention to provide a chip-type solid electrolytic capacitor with a fuse, in which, even after the fuse has been enclosed by a molding resin, the fuse connection can be confirmed, and which can also be applied to small articles and provide stabilized fuse-melting properties.

According to the invention, there is provided a chip-type solid electrolytic capacitor with a fuse, comprising:

a solid electrolytic capacitor element;

an anode terminal connected to an anode lead led from the solid electrolytic capacitor element;

a cathode terminal with a fuse, connected to a cathode layer of the solid electrolytic capacitor element; and a molding resin with which all of the elements are covered so that predetermined portions of the respective anode terminal and cathode terminal are exposed, wherein the cathode terminal has an inside connecting portion, an outside lead portion, and protective resin protecting the fuse for bridging between the inside connecting portion and the outside lead portion, characterized in that part of the protective resin is exposed from the molding resin.

As described above, in the chip-type solid electrolytic capacitor with a fuse, according to the invention, the cathode terminal has the inside connecting portion, the outside lead portion, and the fuse for bridging between the inside connecting portion and the outside lead portion, and the predetermined portions including a fuse connecting portion are protectively insulated in advance by the protective resin. The inside connecting portion of the cathode terminal formed beforehand and the cathode layer of the capacitor element are assembled together so as to be adhered and conducted to each other.

According to the invention, therefore even if the capacitor is short-circuited, destruction of the molding resin and accidental burnout of the capacitor per se are unlikely to occur. Accordingly, it is possible to improve safety of the circuit as a whole.

Moreover, since the connecting length of the fuse is made constant, the step of bridging between the inside connecting portion and the outside lead portion of the cathode terminal by the fuse is automated and simplified to increase the yield. Thus, the manufacturing cost can be reduced and the reliability of the fuse connection can be improved.

Further, by providing a projecting portion on the protective resin, it is possible to confirm the fuse connection from the outside even after the connection has been enclosed by the molding resin and to enlarge the condenser element. Accordingly, it is possible to apply the chip-type solid electrolytic capacitor with a fuse to small articles. Thus, the chip-type solid electrolytic capacitor with a fuse, which is stable in fuse melting properties, to be used in a wide variety of articles can be provided.

DETAILED DESCRIPTION OF THE PREFERRED EMBODIMENT

Figure 1:
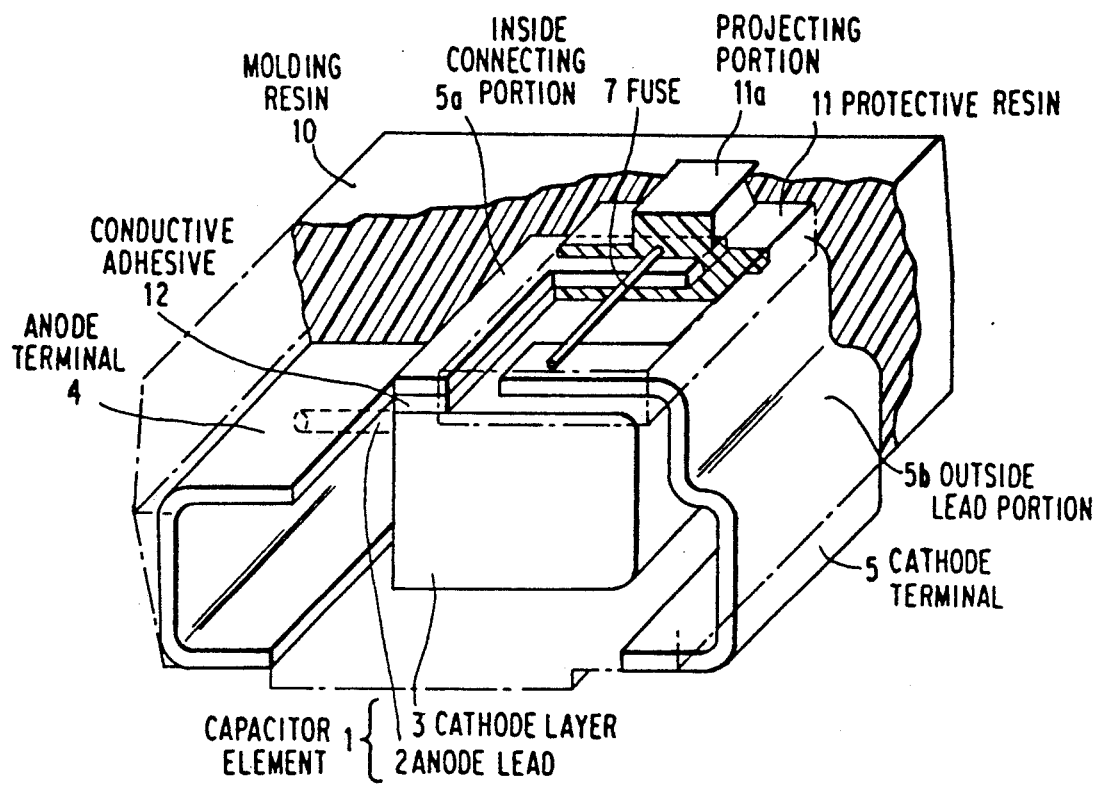
FIG. 1 is a partially cross-sectional perspective view showing the inside structure of an embodiment according to the invention.
Figure 2A:
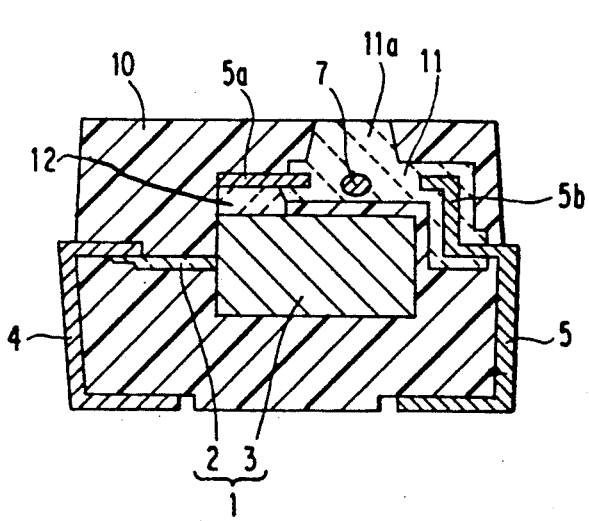
FIGS. 2(a) and 2(b) are, respectively, a cross-sectional view showing the embodiment of the invention, illustrated in FIG. 1, and a top plan view showing a cathode terminal, prior to assemblage, which is used in the embodiment.
Figure 2B:
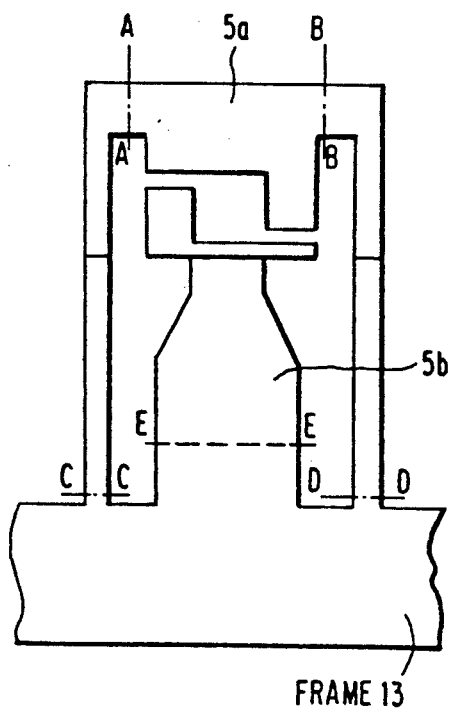

The invention will now be described with reference to the accompanying drawings. FIG. 1 is a partially cross-sectional perspective view showing the inside structure of an embodiment according to the invention, and FIGS. 2(a) and 2(b) are a cross-sectional view of FIG. 1 and a top plan view, respectively, showing the configuration prior to assemblage of a cathode terminal which is used in the embodiment according to the invention.

As shown in FIG. 1, a capacitor element 1 is formed as follows. That is, metal powder having a valve action, such as tantalum, aluminum or the like, is press-molded with an anode lead 2 partially embedded in the metal powder to form an anode body. The anode body is vacuum-sintered and is subsequently anodic-oxidized to form an anodic oxide film. A manganese-dioxide layer, a carbon layer, a plating layer and a solder layer are successively coated on the anodic oxide film to form a cathode layer 3.

A fuse 7 is bridged between an inside connecting portion 5a and an outside lead portion 5b of a cathode terminal 5. The fuse 7 is covered with a protective resin 11 for protecting the same.

The anode lead 2 led from the capacitor element 1 is connected to an anode terminal 4. Further, the cathode layer 3 formed on the outer periphery of the capacitor element 1 is conductively adhered to the inside connecting portion 5a of the cathode terminal 5 by a conductive adhesive 12. The whole body including the elements referred to the above is insulatedly armored by a molding resin 10.

FIG. 2(b) shows a configuration prior to assemblage, of the cathode terminal 5 which is used in the embodiment as described previously. As shown in FIG. 2(b), the inside connecting portion 5a and the outside lead portion 5b, which are connected to the capacitor element 1, are formed integrally with each other and supported by a frame 13.

In the embodiment, first, the inside connecting portion 5a and the outside connecting portion 5b are bridged to each other by soldering or the like on the fuse 7. Subsequently, the inside connecting portion 5a and the outside lead portion 5b are insulatedly covered with the protective resin 11 which is provided with a projecting portion 11a of the order of 0.1 mm such that a predetermined portion is exposed. Thereafter, the exposed portion of the inside connecting portion 5a is cut off along the lines A—A, B—B, C—C and D—D, to form the cathode terminal 5 which has fuse function.

Further, the conductive adhesive 12 is coated on the surface of the inside connecting portion 5a, which is opposed to the condenser element 1, and is thermoset, to electrically connect the capacitor element 1 and the cathode terminal 5. Furthermore, the anode lead 2 and the anode terminal 4 are welded to be secured to each other.

Subsequently, the assembly formed in the manner described above is insulatedly armored by the molding resin 10 so that a predetermined portion of the outside connecting portion 5b between the anode terminal 4 and the cathode terminal 5, and the projecting portion 11a provided on the protective resin 11 are exposed. The transfer mold process is used in forming the molding resin 10.

Thereafter, the frame 13 is cut off along the line E—E as shown in FIG. 2(b). Further, the anode terminal 4 and the outside connecting portion 5b of the cathode terminal 5 are bent along the outer wall of the molding resin 10, to complete the chip-type solid electrolytic capacitor with a fuse according to the first embodiment.

In this embodiment, the configuration of the projecting portion 11a assumes a rectangular trapezoid; however, it is needless to say that similar advantages can be produced if the configuration of the projecting portion 11a is of a truncated cone or a hemisphere.

Figure 3:
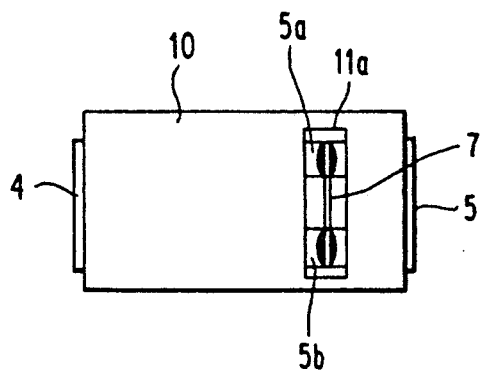
FIG. 3 is a top plan view showing another embodiment of the invention.
Figure 4A:
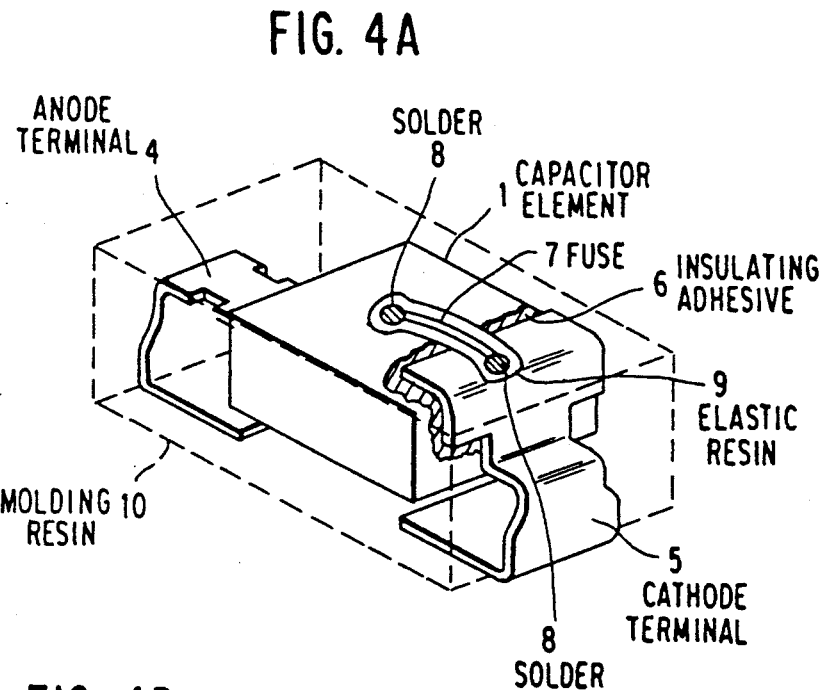
FIGS. 4(a) and 4(b) are a perspective view and a cross-sectional view thereof, respectively, showing the structure of an example of a conventional chip-type solid electrolytic capacitor with a fuse.
Figure 4B:
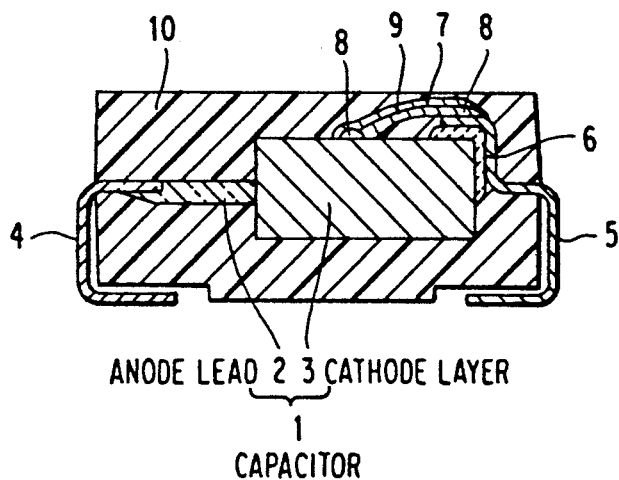

Another embodiment of the invention will next be described. In the above-described first embodiment, the epoxy resin is used as the protective resin 11 illustrated in FIG. 2(a). In the second embodiment, however, if only the protective resin 11 is of a transparent one, the fuse connection can be confirmed from the outside through the projecting portion 11a as illustrated in FIG. 3, even after the connection has been enclosed by the molding resin 10. Moreover, if a resin changeable in color due to a high temperature is used, the protective resin 11 will change its color by the heat generated upon melting of the fuse. Thus, the fuse connection can easily be inspected while the capacitor is mounted on a circuit board.

Next, in order to ascertain the advantages of the invention, the fuse melting properties and fuse resistant values of the chip-type solid electrolytic capacitor with a fuse according to the invention, will be described.

Used were 1000 samples which had been prepared according to the invention. The samples were applied with overcurrent to observe the fuse melting. As a result, among the samples according to the invention, there were none in which the molding resin 10 was destroyed or the element 1 was burnt out during the period of time from the heat-up to the melt down of the fuse. All of the samples functioned surely as safety devices.

It is considered that, according to the embodiments, the above results are due to the fact that the cathode layer 3 of the capacitor element 1 is not located near the fuse 7 and the fact that, since the cathode terminal 5 illustrated in FIGS. 2(a) and 2(b) can be manufactured by punching, flatness and dimension accuracy and uniformity are superior with a result of extremely stabilized properties of the fuse, and the like.

In the embodiments, since the flatness and dimension accuracy and uniformity of the cathode terminal 5 are superior, it is possible to automatically connect the fuse 7 by the use of an automatic wire bonding machine. The manufacturing steps can extremely be simplified. Further, since the fuse 7, the connection portions thereof and the like are preliminarily covered completely with the protective resin 11, the fuse 7 is less likely to be subjected to a mechanical stress during the assembling step to be broken or ruptured. Thus, the reliability is extremely improved.

Furthermore, by provision of the projecting portion 11a of the protective resin 11, the projecting portion 11a is abutted against a mold surface (not shown) for the molding resin 10 at the time of enclosure by the molding resin 10, so that there is no influence by the connection between the anode lead 2 and the anode terminal 4, and that the enclosing position of the cathode terminal 5 is stabilized. Accordingly, it is possible to reduce the thickness of the molding resin 10 interposed between the protective resin 11 and the outside, to 0.2 mm to 0.1 mm. As a result, the configuration of the capacitor element 1 can be increased.

What is claimed is:

1. A chip-type solid electrolytic capacitor with a fuse, comprising:
   a solid electrolytic capacitor element;
   an anode terminal connected to an anode lead led from said solid electrolytic capacitor element;
   a cathode terminal with a fuse, connected to a cathode layer of said solid electrolytic capacitor element; and
   a molding resin with which all of said elements are covered so that predetermined portions of the respective anode terminal and cathode terminal are exposed,
   wherein said cathode terminal has an inside connecting portion, an outside lead portion, and protective resin protecting the fuse for bridging between said inside connecting portion and said outside lead portion,
   characterized in that part of said protective resin is exposed from said molding resin.

2. A chip-type solid electrolytic capacitor with a fuse according to claim 1, wherein said protective resin for protecting the fuse has a projecting portion which is formed into a convex configuration.

3. A chip-type solid electrolytic capacitor with a fuse according to claim 1, wherein said protective resin for protecting the fuse is either a transparent resin or a resin changeable in color at a high temperature.

* * * * *